United States Patent
Kawano

(10) Patent No.: US 7,697,273 B2
(45) Date of Patent: Apr. 13, 2010

(54) DISPLAY DEVICE

(75) Inventor: Masayuki Kawano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 143 days.

(21) Appl. No.: 12/115,101

(22) Filed: May 5, 2008

(65) Prior Publication Data

US 2008/0278896 A1    Nov. 13, 2008

(30) Foreign Application Priority Data

May 11, 2007    (JP) .............................. 2007-126541

(51) Int. Cl.
*H05K 5/02*     (2006.01)
*G02F 1/1333*   (2006.01)
*G02F 1/1335*   (2006.01)

(52) U.S. Cl. .................... 361/679.21; 361/679.02; 345/905; 248/917; 348/794

(58) Field of Classification Search ........... 361/679.02, 361/679.21, 145, 681; 345/905; 248/917; 348/794
See application file for complete search history.

(56) References Cited

U.S. PATENT DOCUMENTS

| | | | | |
|---|---|---|---|---|
| 6,002,582 A * | 12/1999 | Yeager et al. | ........... | 361/679.21 |
| 6,144,552 A * | 11/2000 | Whitcher et al. | ......... | 361/679.3 |
| 6,504,713 B1 * | 1/2003 | Pandolfi et al. | ............. | 361/695 |
| 6,542,206 B1 * | 4/2003 | Saito | ........................ | 349/58 |
| 6,608,748 B1 * | 8/2003 | Ogo et al. | ............... | 361/679.21 |
| 6,677,664 B2 * | 1/2004 | Inoue et al. | ................. | 257/668 |
| 7,164,586 B2 * | 1/2007 | Lin | ........................... | 361/714 |
| 7,372,704 B2 * | 5/2008 | Jeong | ........................ | 361/719 |
| 7,441,938 B2 * | 10/2008 | Sakai et al. | ................. | 362/634 |
| 7,447,034 B2 * | 11/2008 | Shin | ........................... | 361/714 |
| 7,561,427 B2 * | 7/2009 | Jeong | ........................ | 361/704 |
| 2003/0122993 A1 | 7/2003 | Eiraku et al. | | |
| 2003/0179580 A1 * | 9/2003 | Ito et al. | ...................... | 362/306 |
| 2005/0078446 A1 * | 4/2005 | Bae | ............................. | 361/687 |
| 2005/0174301 A1 * | 8/2005 | Kim | ........................... | 345/3.1 |
| 2005/0190577 A1 * | 9/2005 | Nishida et al. | ............. | 362/615 |
| 2005/0254258 A1 * | 11/2005 | Lee | ............................. | 362/612 |
| 2005/0286228 A1 * | 12/2005 | Kim | ........................... | 361/704 |

(Continued)

FOREIGN PATENT DOCUMENTS

JP            7-28083           1/1995

(Continued)

*Primary Examiner*—Anatoly Vortman
(74) *Attorney, Agent, or Firm*—Oblon, Spivak, McClelland, Maier & Neustadt, L.L.P.

(57) ABSTRACT

A liquid crystal display according to this invention includes a liquid crystal display panel, a frame assembly accommodating the liquid crystal display panel and being provided with a space adjacent to an end of the accommodated liquid crystal display panel, and a designed package covering the frame assembly. There is provided on a surface of the frame assembly with a through hole exposing the space and the end of the liquid crystal display panel adjacent to the space. Further, provided on an inner surface of the designed package is a positioning projection which passes through the through hole to be brought into contact with the end of the liquid crystal display panel within the space. As the designed package and the liquid crystal display panel can be positioned directly with each other, it is possible to realize accurate positioning of the designed package with respect to the liquid crystal display panel.

6 Claims, 15 Drawing Sheets

U.S. PATENT DOCUMENTS

| | | | |
|---|---|---|---|
| 2006/0012963 A1* | 1/2006 | Nishimura et al. | 361/714 |
| 2007/0165425 A1* | 7/2007 | Sakamoto et al. | 362/633 |
| 2007/0211494 A1* | 9/2007 | Ito et al. | 362/632 |
| 2007/0241993 A1* | 10/2007 | Monden et al. | 345/58 |

FOREIGN PATENT DOCUMENTS

| | | | |
|---|---|---|---|
| JP | 09189969 A * | 7/1997 | |
| JP | 11-281963 | 10/1999 | |
| JP | 11337937 A * | 12/1999 | |
| JP | 2001-83887 | 3/2001 | |
| JP | 2003-195781 | 7/2003 | |

* cited by examiner

F I G . 1 7
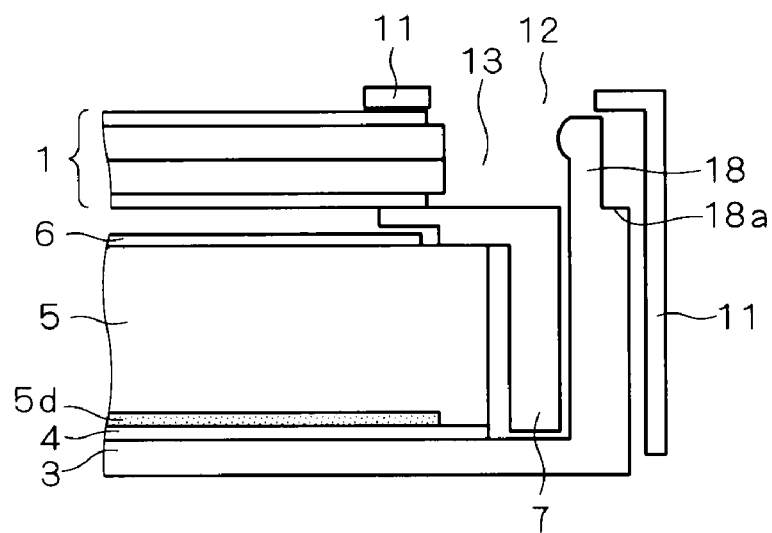
F I G . 1 8
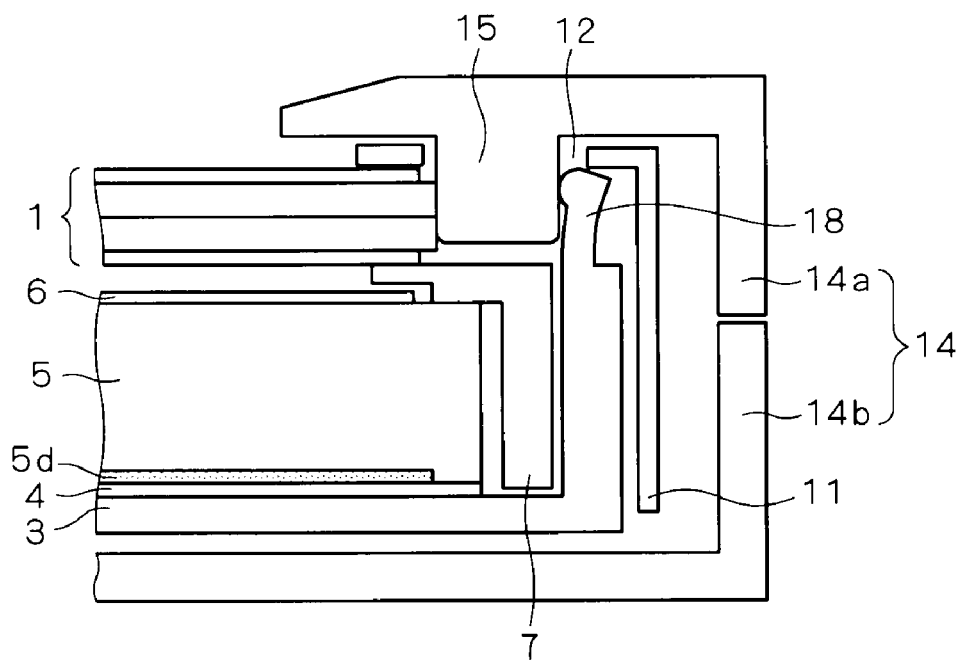

DISPLAY DEVICE

BACKGROUND OF THE INVENTION

1. Field of the Invention

The present invention relates to a display device including a display panel such as a liquid crystal display panel.

2. Description of the Background Art

A liquid crystal display (LCD) is a light-receiving type display device including a backlight and a liquid crystal display panel which displays an image by controlling a transmittance of light emitted from the backlight.

The liquid crystal display panel includes a glass substrate formed with wiring and electrodes, an opposed substrate opposing the glass substrate, and liquid crystals interposed between these substrates. A polarization plate is attached to each of the glass substrate and the opposed substrate. A display area of the liquid crystal display panel is formed by a large number of pixels. When a signal corresponding to an image is applied to each of the pixels, a transmittance of light is controlled in each of the pixels. In such a case, the image becomes visible from outside by irradiating the pixels with light emitted from the backlight which is disposed at a rear side of the liquid crystal display panel.

The liquid crystal display of this type is widely used in various applications because of advantages thereof such as lightweight and thinned properties. Such a liquid crystal display is used as a display of a personal computer, an on-vehicle display device, a display device of industrial apparatuses, and the like.

In recent years, there has been proposed a liquid crystal display including a designed package which has design properties. Such a liquid crystal display requires accurate positioning between a liquid crystal display panel and the designed package so that displacement therebetween is reduced. Japanese Patent Application Laid-Open No. 2003-195781 describes a liquid crystal display in which a positioning pin provided to a designed package is fitted into a hole provided in a frame accommodating a backlight when the liquid crystal display panel is positioned.

However, in a conventional liquid crystal display or the liquid crystal display described in Japanese Patent Application Laid-Open No. 2003-195781, the designed package and the liquid crystal display panel are not positioned directly with each other, but the designed package and the liquid crystal display panel are positioned with the frame interposed therebetween. Accordingly, there has been a problem that the designed package and the liquid crystal display panel cannot be accurately positioned with each other. Further, in some cases, there has been a problem that the designed package partially interrupts the display area of the liquid crystal display panel, or a problem that the frame is exposed from an opening of the designed package.

SUMMARY OF THE INVENTION

It is an object of the present invention to provide a display device enabling accurate positioning between a designed package and a liquid crystal display panel by directly positioning the designed package with respect to the liquid crystal display panel.

The display device according to the present invention includes a display panel, a frame assembly accommodating the display panel and being provided with a space adjacent to an end of the accommodated display panel, and a package covering the frame assembly. On a surface of the frame assembly covering an end of the display panel on a display side, there is provided with a through hole exposing the space and the end of the display panel adjacent to the space. Provided on an inner surface of the package is a projection passing through the through hole to be brought into contact with the end of the display panel within the space.

Since the projection of the package allows direct positioning between the package and the display panel, the package can be accurately positioned with respect to the display panel.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 17 and 18 are cross sectional views each showing a configuration of a liquid crystal display according to Sixth Embodiment;

DESCRIPTION OF THE PREFERRED EMBODIMENTS

First Embodiment

Description is given below to a display device according to the present invention, with an assumption that the display device is a liquid crystal display. Before describing a liquid crystal display according to the present embodiment, brief description is given to a configuration of a conventional liquid crystal display.

Figure 27:
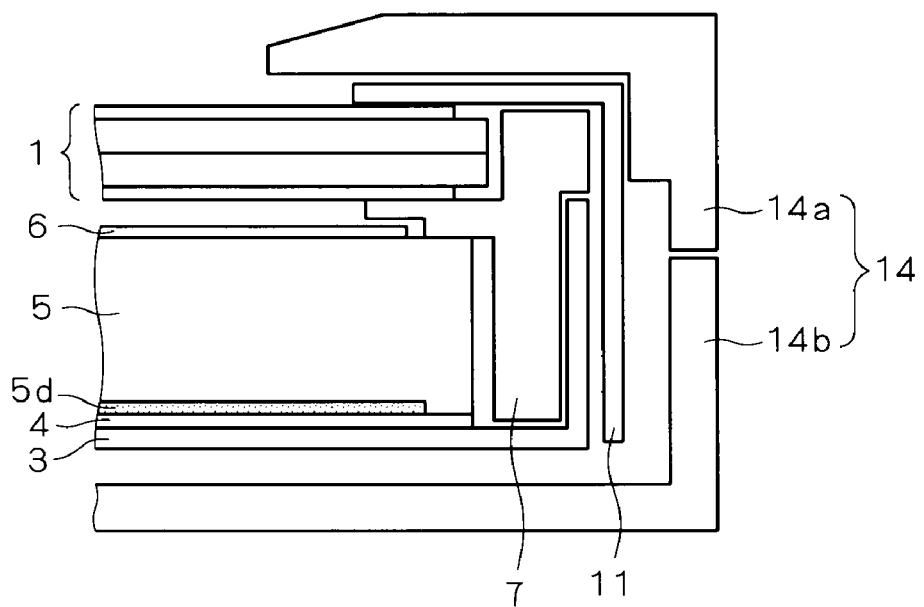
FIGS. 27 and 28 are cross sectional views each showing a configuration of a conventional liquid crystal display.

FIG. 27 is a cross sectional view of the conventional liquid crystal display. The conventional liquid crystal display includes a liquid crystal display panel 1, a frame assembly, a backlight, and a designed package 14. The backlight has a reflector plate 4, a planar light guide plate 5, and an optical sheet 6. The frame assembly includes a first frame accommodating the backlight, and a second frame accommodating the backlight, with the first frame accommodating the backlight, and the liquid crystal display panel 1 laid thereon. In this drawing, the first frame corresponds to a rear frame 3 and a middle frame 7, and the second frame corresponds to a front frame 11.

The backlight irradiates with light from the planar light guide plate 5 toward the liquid crystal display panel 1. The liquid crystal display panel 1 controls a transmittance of light coming from the planar light guide plate 5 to display an image to outside. The front frame 11 is provided with an opening which allows the image on the liquid crystal display panel 1 to be displayed to outside.

The designed package 14 includes a front-side designed casing body 14a and a rear-side designed casing body 14b. As shown in FIG. 27, the designed package 14 covers the above-described frame assembly. According to this drawing, the designed package 14 covers the rear frame 3, the middle frame 7, and the front frame 11. There is provided in the front-side designed casing body 14a an opening which allows the image on the liquid crystal display panel 1 to be displayed to outside, such that the opening is laid on the opening of the front frame 11. The opening of the front-side designed casing body 14a is made smaller than the opening of the front frame 11 so that the front frame 11 is not exposed to outside.

In the conventional liquid crystal display, the front frame 11 and the middle frame 7 are interposed between the designed package 14 and the liquid crystal display panel 1. In such a configuration, there arises a problem that the designed package 14 and the liquid crystal display panel 1 cannot be accurately positioned because of a difference in accuracy and a clearance in each of the front frame 11 and the middle frame 7. Further, in some cases, the designed package 14 partially interrupts a display area of the liquid crystal display panel 1, or the front frame 11 is exposed from the opening of the designed package 14.

Figure 28:
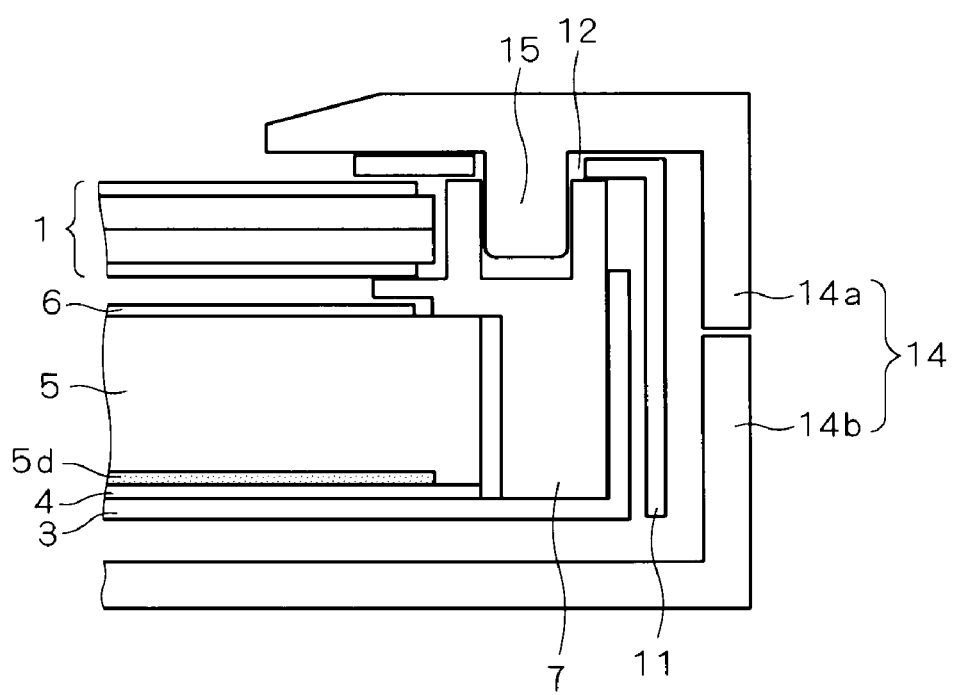

FIG. 28 is a cross sectional view of another conventional liquid crystal display. In this liquid crystal display, a positioning projection 15 provided on an inner surface of a designed package 14 is fitted into a recess provided in a middle frame 7, so that accurate positioning is realized between the middle frame 7 and the designed package 14. However, even in this configuration, the middle frame 7 is interposed between the designed package 14 and the liquid crystal display panel 1. Accordingly, as in the above-described liquid crystal display, there arises a problem that the designed package 14 and the liquid crystal display panel 1 cannot be accurately positioned with each other because of a difference in accuracy and a clearance of the middle frame 7.

Figure 1:
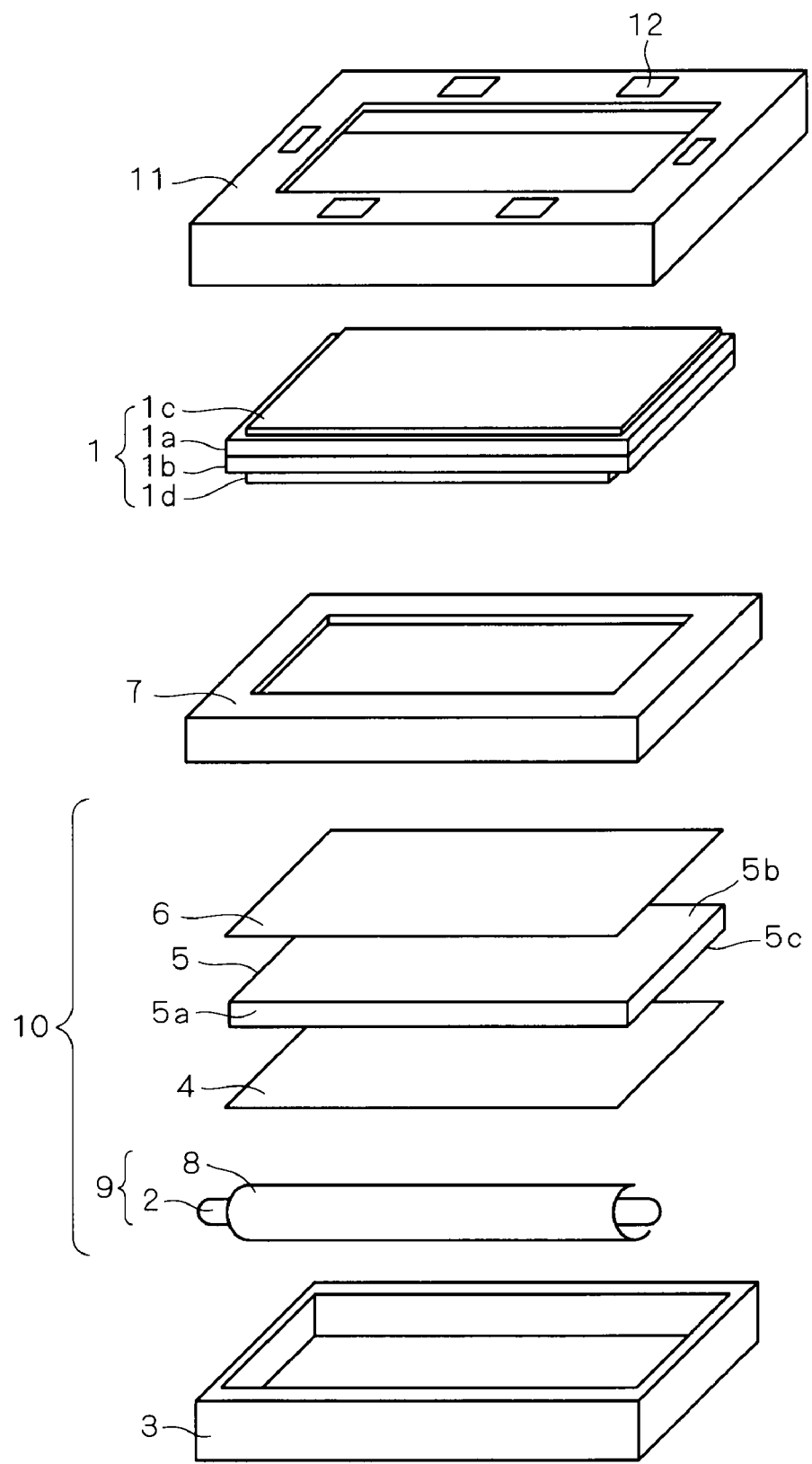
FIG. 1 is an exploded perspective view showing a configuration of a liquid crystal display according to First Embodiment.
Figure 2:
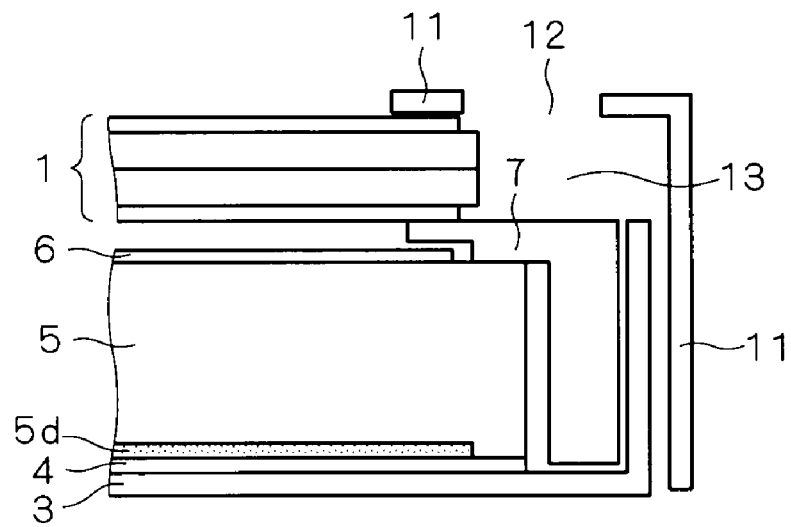
FIGS. 2 and 3 are cross sectional views each showing the configuration of the liquid crystal display according to First Embodiment.
Figure 3:
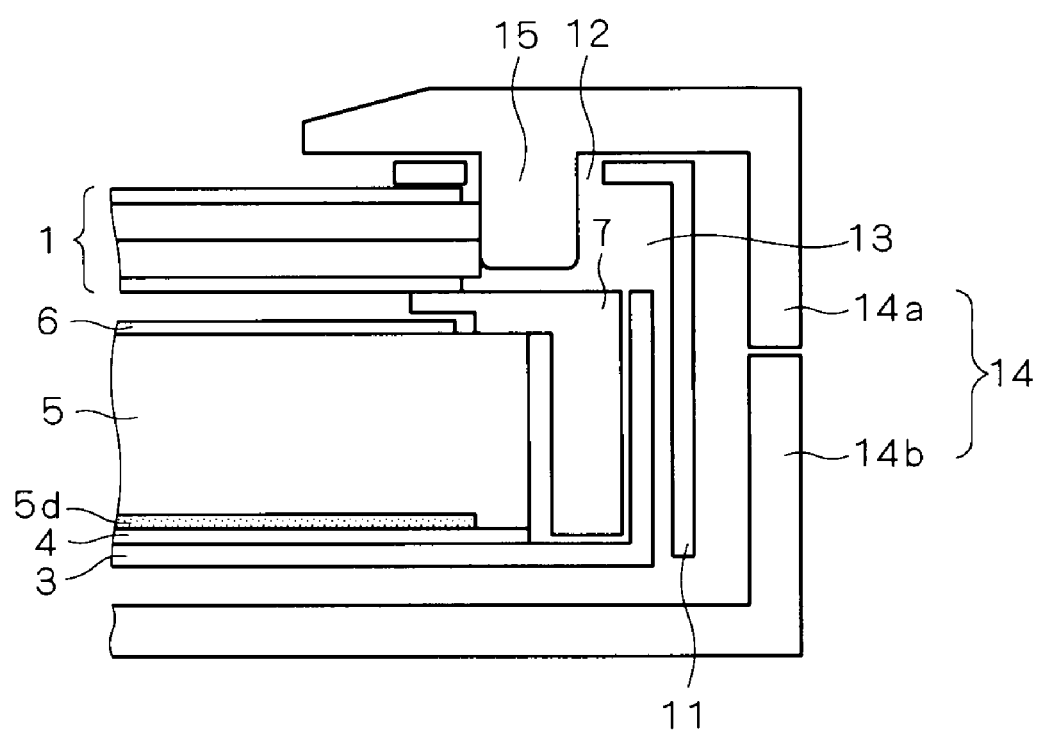

Below described is the liquid crystal display according to the present embodiment which can solve such problems. FIG. 1 is an exploded perspective view showing a schematic configuration of the liquid crystal display according to the present embodiment without showing a designed package 14. FIG. 2 is a cross sectional view showing a state before the designed package 14 is incorporated, while FIG. 3 is a cross sectional view showing a state after the designed package 14 is incorporated. As shown in these drawings, the liquid crystal display according to the present embodiment includes a liquid crystal display panel 1 functioning as a display panel, a frame assembly, a backlight 10, and the designed package 14.

As shown in FIG. 1, the frame assembly includes a first frame accommodating the backlight 10 which irradiates the liquid crystal display panel 1 with light, and a second frame accommodating the backlight 10, with the first frame accommodating the backlight 10, and the liquid crystal display panel 1 laid thereon. According to the present embodiment, the first frame corresponds to a rear frame 3 and a middle frame 7, and the second frame corresponds to a front frame 11.

The liquid crystal display panel 1 functioning as a display element of the liquid crystal display according to the present embodiment controls a transmittance of light emitted from the backlight 10 to display an image to outside. The liquid crystal display panel 1 includes an upper substrate 1a, a lower substrate 1b, and polarization plates 1c and 1d. One of the upper substrate 1a and the lower substrate 1b is a TFT array substrate, and the remaining is an opposed substrate. On one of the upper substrate 1a and the lower substrate 1b, there are formed a pigmented layer, a light shielding layer, a thin film transistor (TFT) functioning as a switching element, electrodes such as a pixel electrode, and wiring.

Between the upper substrate 1a and the lower substrate 1b, there are provided a spacer retaining constantly a distance between these substrates, a seal material attaching these substrates with each other, liquid crystals, a sealant which seals the injected liquid crystals, and an oriented film providing the liquid crystals with initial orientation. There are provided the polarization plate 1c on an outer surface of the upper substrate 1a and the polarization plate 1d on an outer surface of the lower substrate 1b. Each of the polarization plates 1c and 1d allows light only of a specific polarization component in the light emitted from the backlight 10 to be transmitted therethrough.

As shown in FIG. 1, the backlight 10 includes a reflector plate 4, a planar light guide plate 5, an optical sheet 6, and a light source unit 9.

The planar light guide plate 5 is disposed such that an incidence plane 5a thereof faces a light source 2 of the light source unit 9. The planar light guide plate 5 is provided with an exit plane 5b such that the exit plane 5b is substantially orthogonal to the incidence plane 5a. As shown in FIG. 2, there is formed on an opposite plane 5c of the exit plane 5b a printed dot pattern 5d disarranging a direction of light propagation. The planar light guide plate 5 is a transparent medium and is made of acrylic, polycarbonate, glass, or the like.

According to the present embodiment, the printed dot pattern 5d is provided on the opposite plane 5c of the exit plane 5b. However, provision of the printed dot pattern 5d is not limited thereto. Instead of providing the printed dot pattern 5d, the exit plane 5b or the opposite plane 5c of the exit plane 5b may be made into a roughened plane, or may be made uneven so as to change the direction of light propagation by forming minute spherical surfaces, a prism, or the like.

The optical sheet 6 is provided to be adjacent to the exit plane 5b of the planar light guide plate 5. The optical sheet 6 may be made of a diffusion sheet, a prism sheet, a polarized reflection sheet, or any of combinations thereof. The present embodiment is described with an assumption that the optical sheet 6 is made of a diffusion sheet. It is noted that effects of the present embodiment are not changed even when the optical sheet 6 is not provided.

The reflector plate 4 is provided to be adjacent to one of planes other than the incidence plane 5a and the exit plane 5b of the planar light guide plate 5. According to the present embodiment, the reflector plate 4 is provided to be adjacent to the opposite plane 5c of the exit plane, and is made of a diffuse reflective material having a reflectance of not less than 90%. However, the position of the reflector plate 4 is not limited to the above. Further, the material for the reflector plate 4 is not limited to the above, but the reflector plate 4 may be made of a specular material such as an evaporated silver sheet.

As shown in FIG. 1, the light source unit 9 has the light source 2 and a reflector 8 covering the light source 2. The light source 2 is supplied with electric power from an electric power supply (not shown) and emits light by using the electric power. While a lamp is used as the light source 2 in the present embodiment, the light source 2 is not limited thereto but may be a point light source such as arranged LEDs.

The reflector 8 of the light source unit 9 reflects light emitted from the light source 2 and allows the reflected light to be incident into the incidence plane 5a of the planar light guide plate 5. In the present embodiment, the reflector 8 is made of a metal plate with a diffuse reflective material having a reflectance of not less than 90% attached thereto. The reflector 8 is not limited to the above, but may be made of a metal plate with a specular material such as an evaporated silver sheet attached thereto, a metal plate with a polarizing reflective material attached thereto, a coated material, or a material processed by mirror-like finishing. Further alternatively, a configuration may be adopted in which the reflector plate 4 is extended and bent to cover the light source 2, so that a part of the reflector plate 4 is utilized as the reflector 8.

As described above, the frame assembly according to the present embodiment includes the rear frame 3 and the middle frame 7 each accommodating the backlight 10 which irradiates the liquid crystal display panel 1 with light, and the front frame 11 accommodating the backlight 10 with the rear frame 3 and the middle frame 7 accommodating the backlight 10 and the liquid crystal display panel 1 laid thereon. As shown in FIG. 2, the frame assembly accommodates the liquid crystal display panel 1 and is provided with a space 13 adjacent to an end of the accommodated liquid crystal display panel 1.

The frame assembly is provided, on a surface covering an end of a display side of the display panel 1, with a through hole 12 which exposes the space 13 and the end of the liquid crystal display panel 1 adjacent to the space 13. As shown in FIGS. 1 and 2, in the present embodiment, the through hole 12 is provided on a surface of the front frame 11 in the above-described frame assembly.

Figure 4:
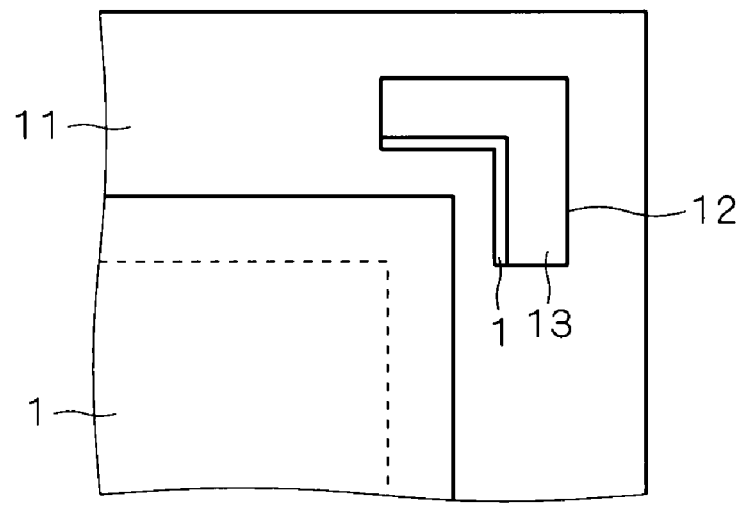
FIGS. 4 to 6 are elevational views each showing the configuration of the liquid crystal display according to First Embodiment.
Figure 5:
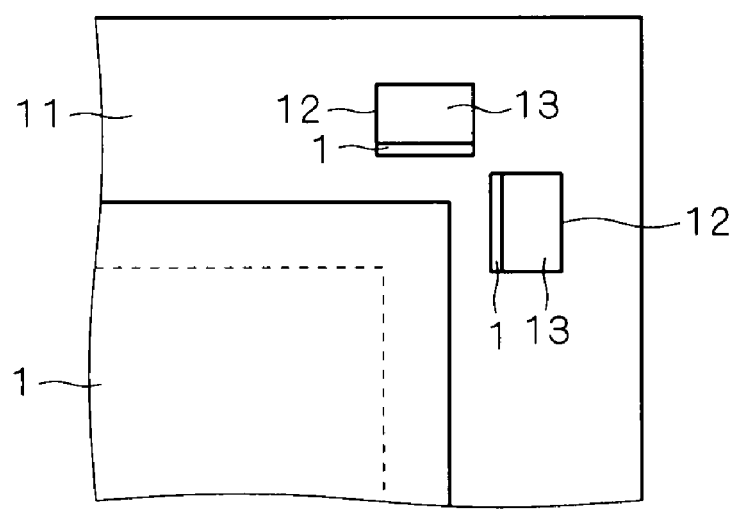
Figure 6:
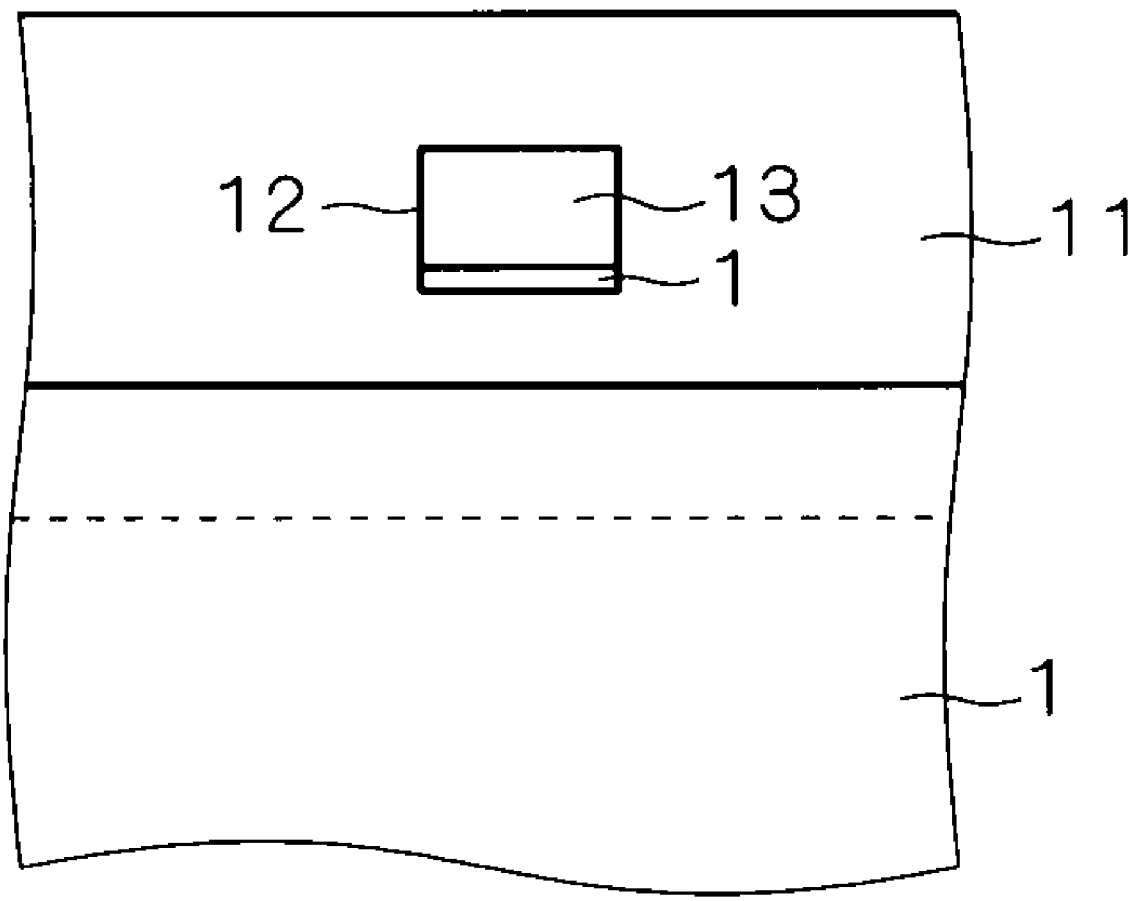

FIGS. 4 to 6 are partial elevational views each showing an example of the present embodiment. The through hole 12 on the surface of the front frame 11 may be provided so as to expose a corner of the liquid crystal display panel 1 as shown in FIGS. 4 and 5, or may be provided so as to expose a side of the liquid crystal display panel 1 as shown in FIG. 6. It is noted that a dashed line in each of FIGS. 4 to 6 indicates an opening of the designed package 14 in a case where the liquid crystal display is covered with the designed package 14.

With reference to FIG. 3, description is given to the designed package 14 according to the present embodiment. As shown in FIG. 3, the designed package 14 according to the present embodiment includes a front-side designed casing body 14a and a rear-side designed casing body 14b, and the designed package 14 functioning as a package covers the above-described frame assembly. In the present embodiment, the designed package 14 covers the rear frame 3, the middle frame 7, and the front frame 11.

Figure 7:
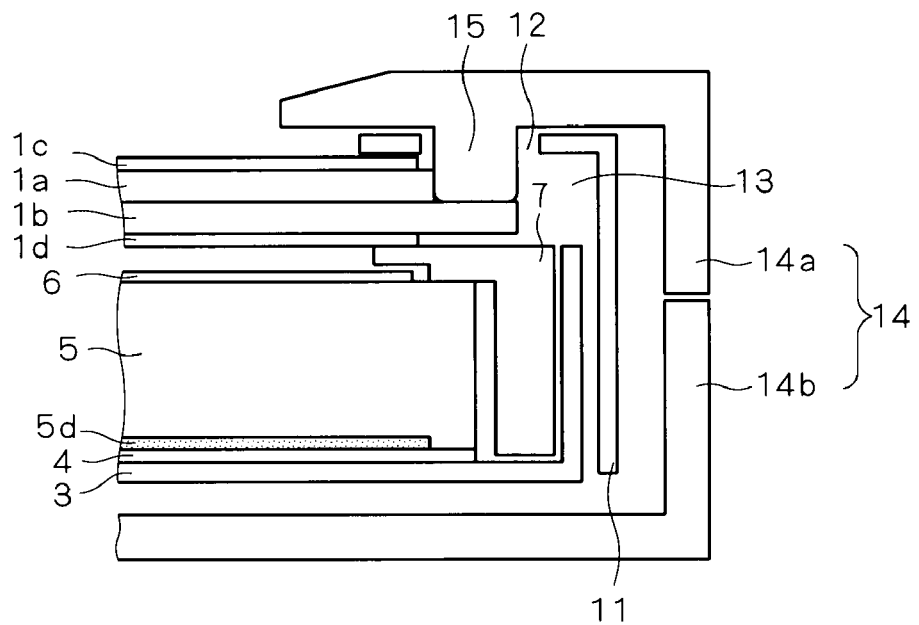
FIGS. 7 and 8 are cross sectional views each showing the configuration of the liquid crystal display according to First Embodiment.
Figure 8:
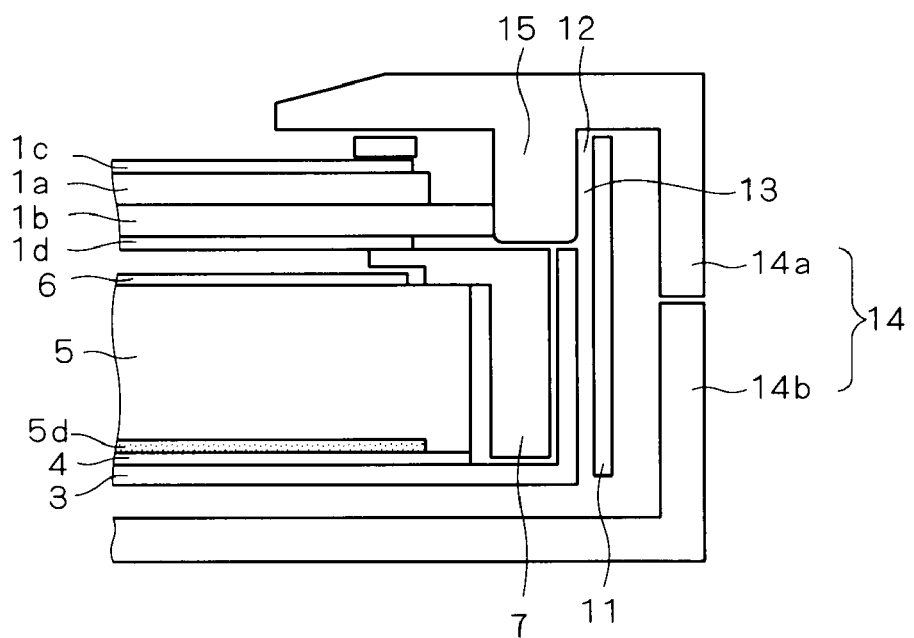

On an inner surface of the designed package 14, there is provided a positioning projection 15 which passes through the through hole 12 to be brought into contact with the end of the liquid crystal display panel 1 within the space 13. As shown in FIG. 3, the positioning projection 15 according to the present embodiment is provided to the front-side designed casing body 14a. In FIG. 3, the positioning projection 15 is in contact with the end of the liquid crystal display panel 1 such that the positioning projection 15 is in contact with both an end of the upper substrate 1a and an end of the lower substrate 1b of the liquid crystal display panel 1. However, the present invention is not limited thereto, but the positioning projection 15 may be in contact only with the end of the upper substrate 1a as shown in FIG. 7, or may be in contact only with the end of the lower substrate 1b as shown in FIG. 8.

In the configuration of the liquid crystal display according to the present embodiment, the positioning projection 15 of the designed package 14 is in direct contact with the end of the liquid crystal display panel 1. Accordingly, the designed package 14 and the liquid crystal display panel 1 can be positioned directly with each other, realizing accurate positioning of the designed package 14 with respect to the liquid crystal display panel 1.

It is noted that, in the present embodiment, description has been given to the display device according to the present invention, with an assumption that the display device is a liquid crystal display. However, the display device according to the present invention is not limited to the above, but may be of a different type as long as the display device includes a display panel. Further, although the present embodiment describes the liquid crystal display including the middle frame 7, the above-described effects can be obtained even in a case where the middle frame 7 is not provided.

Second Embodiment

Figure 9:
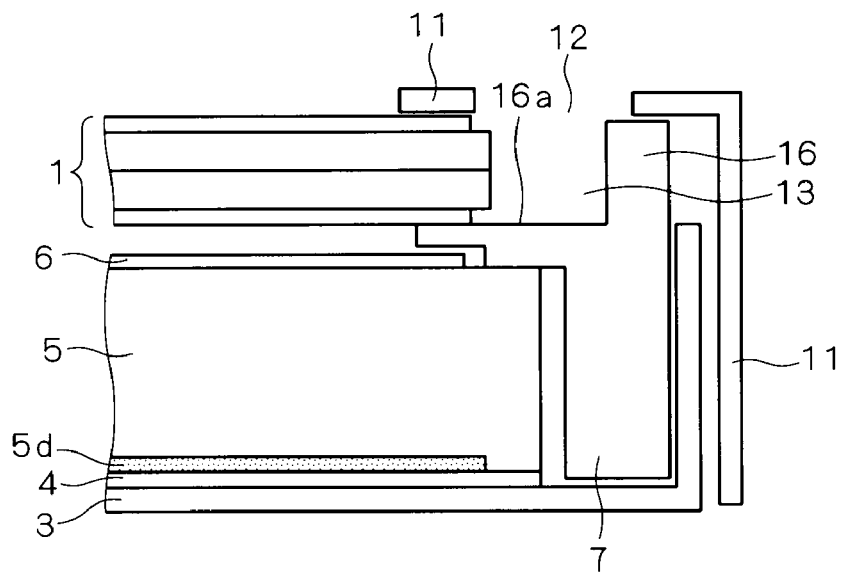
FIGS. 9 and 10 are cross sectional views each showing a configuration of a liquid crystal display according to Second Embodiment.
Figure 10:
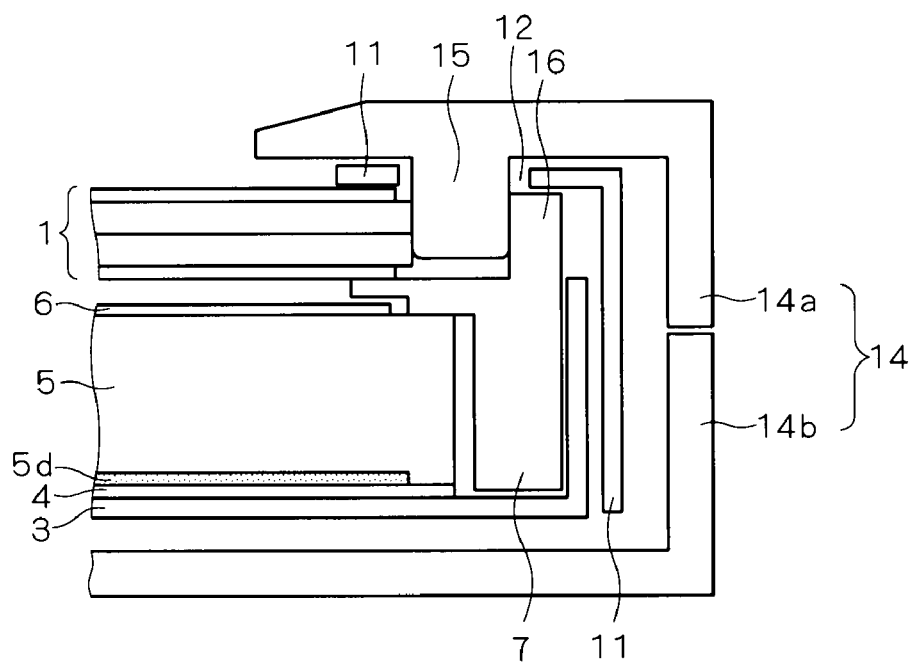

FIG. 9 is a cross sectional view showing a liquid crystal display according to the present embodiment before a designed package 14 is incorporated, and FIG. 10 is a cross sectional view showing the liquid crystal display according to the present embodiment after the designed package 14 is incorporated. In the following description, among constituents of the liquid crystal display according to the present embodiment, those identical to constituents according to First Embodiment are designated by identical symbols, and constituents which are not additionally described are assumed to be identical to those according to First Embodiment. The present embodiment is different from First Embodiment in that no consideration is given to a case of providing no middle frame 7.

A frame assembly of the liquid crystal display according to the present embodiment includes, similarly to the display of First Embodiment, a rear frame 3 and the middle frame 7 each accommodating a backlight 10 which irradiates a liquid crystal display panel 1 with light, and a front frame 11 accommodating the backlight 10, with the rear frame 3 and the middle frame 7 accommodating the backlight 10, and the liquid crystal display panel 1 laid thereon. In the present embodiment, there is provided to the middle frame 7 in the frame assembly a regulator body which faces an end of the liquid crystal display panel 1 with a space 13 provided therebetween to regulate a position of a positioning projection 15 of the designed package 14.

As shown in FIG. 9, the regulator body according to the present embodiment is provided as a projecting part 16 formed on the middle frame 7 so as to project substantially perpendicularly from a plane 16a of the middle frame 7 toward the front frame 11. As shown in FIG. 10, when the designed package 14 is incorporated to a configuration shown in FIG. 9, the positioning projection 15 of the designed package 14 and the projecting part 16 of the middle frame 7 are brought into contact with each other. The positioning projection 15 of the designed package 14 passes through a through hole 12 and is brought into contact with the end of the liquid crystal display panel 1 within the space 13.

In the configuration of the liquid crystal display according to the present embodiment, similarly to the display of First Embodiment, the designed package 14 and the liquid crystal display panel 1 can be positioned directly with each other, thereby realizing accurate positioning of the designed package 14 with respect to the liquid crystal display panel 1.

In the liquid crystal display according to the present embodiment, the projecting part 16 which regulates the position of the positioning projection 15 of the designed package 14 is provided to the middle frame 7. Accordingly, it is possible to prevent the positioning projection 15 from being detached from the end of the liquid crystal display panel 1 even in a case where the designed package 14 is applied with an external impact or the like. Thus, in the liquid crystal display according to the present embodiment, displacement can be prevented between the designed package 14 and the liquid crystal display panel 1 even when the designed package 14 is applied with an external impact.

Third Embodiment

Figure 11:
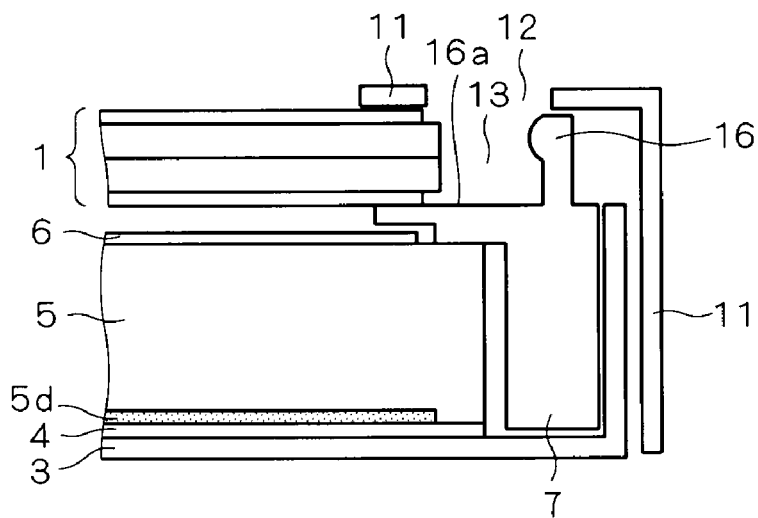
FIGS. 11 and 12 are cross sectional views each showing a configuration of a liquid crystal display according to Third Embodiment.
Figure 12:
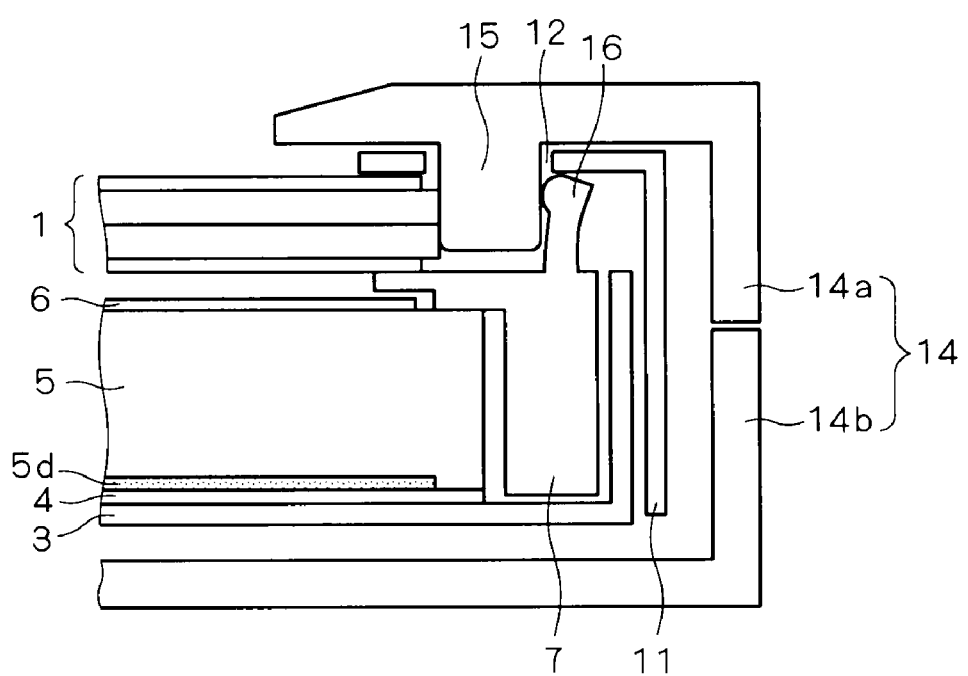

FIG. 11 is a cross sectional view showing a liquid crystal display according to the present embodiment before a designed package 14 is incorporated, and FIG. 12 is a cross sectional view showing the liquid crystal display according to the present embodiment after the designed package 14 is incorporated. In the following description, among constituents of the liquid crystal display according to the present embodiment, those identical to constituents according to Second Embodiment are designated by identical symbols, and constituents which are not additionally described are assumed to be identical to those according to Second Embodiment. Similarly to Second Embodiment, no consideration is given to a case of providing no middle frame 7 in the present embodiment.

As shown in FIG. 11, a regulator body according to the present embodiment is provided as a projecting part 16 formed on the middle frame 7 so as to project substantially perpendicularly from a plane 16*a* of the middle frame 7 toward a front frame 11. The projecting part 16 has a tongue-like shape and is provided at a tip thereof with a convex portion such as a hemispherical portion.

As shown in FIG. 12, when the designed package 14 is incorporated to the configuration shown in FIG. 11, the projecting part 16 elastically presses a side surface of a positioning projection 15 of the designed package 14. The positioning projection 15 of the designed package 14 passes through a through hole 12 and is brought into contact with an end of a liquid crystal display panel 1 within a space 13.

In the configuration of the liquid crystal display according to the present embodiment, similarly to the display of First Embodiment, the designed package 14 and the liquid crystal display panel 1 can be positioned directly with each other, thereby realizing accurate positioning of the designed package 14 with respect to the liquid crystal display panel 1.

In the liquid crystal display according to the present embodiment, the projecting part 16 elastically pressing the side surface of the positioning projection 15 of the designed package 14 is provided to the middle frame 7. Accordingly, displacement can be prevented between the designed package 14 and the liquid crystal display panel 1 more effectively in comparison to a case of Second Embodiment, even when the designed package 14 is applied with an external impact.

Fourth Embodiment

Figure 13:
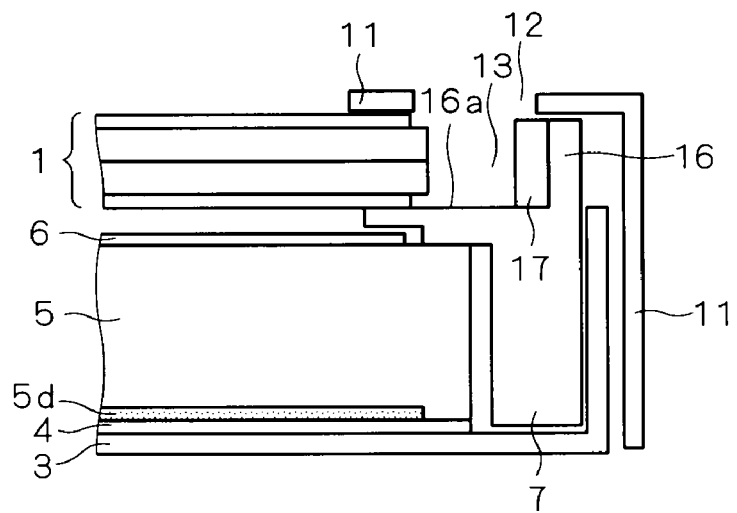
FIGS. 13 and 14 are cross sectional views each showing a configuration of a liquid crystal display according to Fourth Embodiment.
Figure 14:
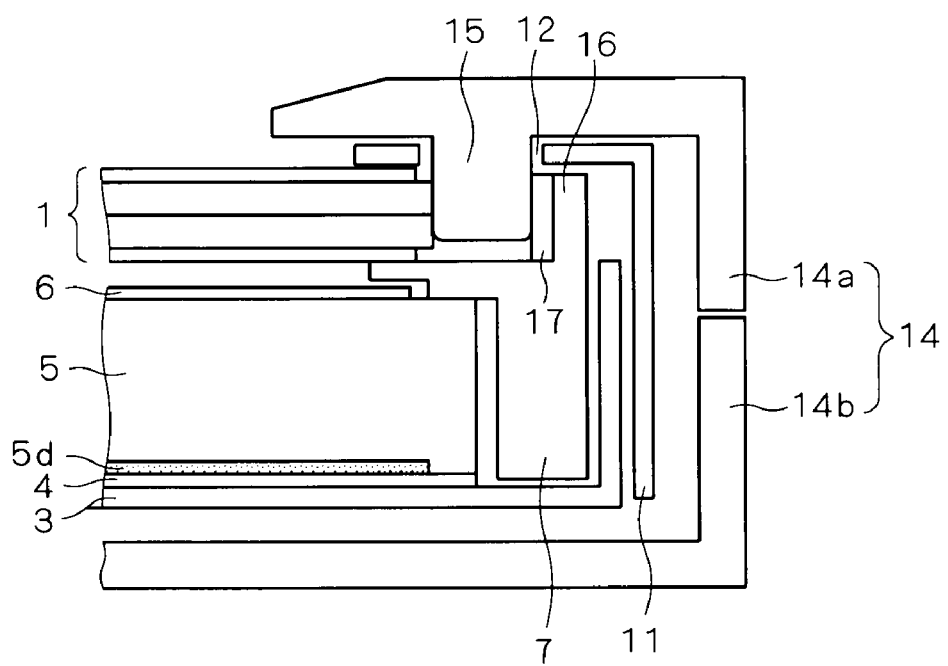

FIG. 13 is a cross sectional view showing a liquid crystal display according to the present embodiment before a designed package 14 is incorporated, and FIG. 14 is a cross sectional view showing the liquid crystal display according to the present embodiment after the designed package 14 is incorporated. In the following description, among constituents of the liquid crystal display according to the present embodiment, those identical to constituents according to Second Embodiment are designated by identical symbols, and constituents which are not additionally described are assumed to be identical to those according to Second Embodiment. In the present embodiment, as in Second Embodiment, no consideration is given to a case where a middle frame 7 is not provided.

As shown in FIG. 13, a regulator body is provided as a projecting part 16 formed on the middle frame 7 so as to project substantially perpendicularly from a plane 16*a* of the middle frame 7 toward a front frame 11. According to the present embodiment, the regulator body further has a cushioning material 17, functioning as an elastic member, which is disposed on the projecting part 16 of the middle frame 7 so as to face a positioning projection 15 of the designed package 14 and elastically presses a side surface of the positioning projection 15 of the designed package 14.

As shown in FIG. 14, when the designed package 14 is incorporated to a configuration shown in FIG. 13, the cushioning material 17 elastically presses the side surface of the positioning projection 15 of the designed package 14. The positioning projection 15 of the designed package 14 passes through a through hole 12 and is brought into contact with an end of a liquid crystal display panel 1 within a space 13.

In the configuration of the liquid crystal display according to the present embodiment, similarly to the display of First Embodiment, the designed package 14 and the liquid crystal display panel 1 can be positioned directly with each other, thereby realizing accurate positioning of the designed package 14 with respect to the liquid crystal display panel 1.

In the liquid crystal display according to the present embodiment, the cushioning material 17, which is disposed on the projecting part 16 of the middle frame 7 so as to face the positioning projection 15 of the designed package 14, elastically presses the side surface of the positioning projection 15. Thus, displacement can be prevented between the designed package 14 and the liquid crystal display panel 1 more effectively in comparison to a case of Second Embodiment, even when the designed package 14 is applied with an external impact.

Fifth Embodiment

Figure 15:
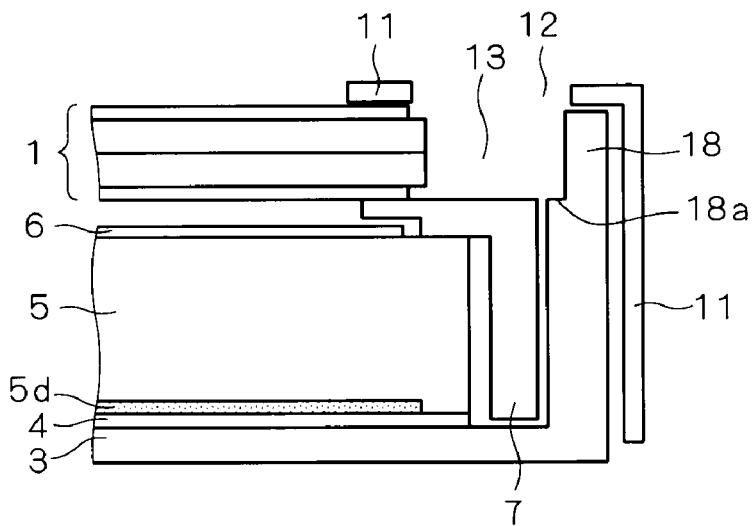
FIGS. 15 and 16 are cross sectional views each showing a configuration of a liquid crystal display according to Fifth Embodiment.
Figure 16:
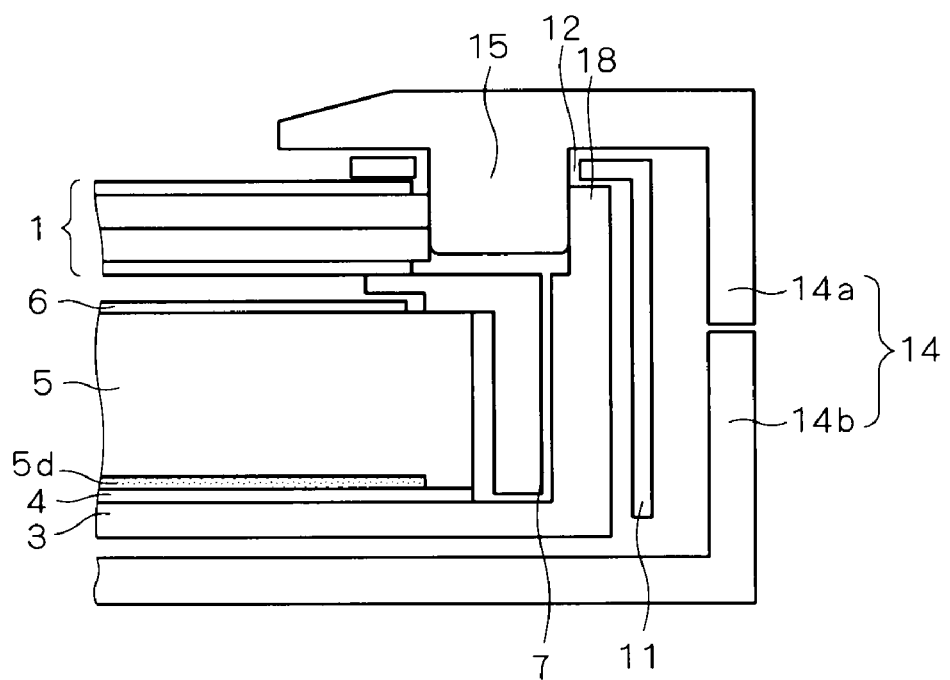

FIG. 15 is a cross sectional view showing a liquid crystal display according to the present embodiment before a designed package 14 is incorporated, and FIG. 16 is a cross sectional view showing the liquid crystal display according to the present embodiment after the designed package 14 is incorporated. In the following description, among constituents of the liquid crystal display according to the present embodiment, those identical to constituents according to First Embodiment are designated by identical symbols, and constituents which are not additionally described are assumed to be identical to those according to First Embodiment.

A frame assembly of the liquid crystal display according to the present embodiment includes, similarly to the display of First Embodiment, a rear frame 3 and a middle frame 7 each accommodating a backlight 10 which irradiates a liquid crystal display panel 1 with light, and a front frame 11 accommodating the backlight 10, with the rear frame 3 and the middle frame 7 accommodating the backlight 10, and the liquid crystal display panel 1 laid thereon. In the present embodiment, there is provided to the rear frame 3 in the frame assembly a regulator body which faces an end of the liquid crystal display panel 1 with a space 13 provided therebetween to regulate a position of a positioning projection 15 of the designed package 14.

As shown in FIG. 15, the regulator body according to the present embodiment is provided as a projecting part 18 formed on the rear frame 3 so as to project substantially perpendicularly from a plane 18a of the rear frame 3 toward the front frame 11. As shown in FIG. 16, when the designed package 14 is incorporated to a configuration shown in FIG. 15, the positioning projection 15 of the designed package 14 and the projecting part 18 of the rear frame 3 are brought into contact with each other. The positioning projection 15 of the designed package 14 passes through a through hole 12 and is brought into contact with the end of the liquid crystal display panel 1 within the space 13.

In the configuration of the liquid crystal display according to the present embodiment, similarly to the display of First Embodiment, the designed package 14 and the liquid crystal display panel 1 can be positioned directly with each other, thereby realizing accurate positioning of the designed package 14 with respect to the liquid crystal display panel 1.

In the liquid crystal display according to the present embodiment, the projecting part 18 which regulates the position of the positioning projection 15 of the designed package 14 is provided to the rear frame 3. Accordingly, it is possible to prevent the positioning projection 15 from being detached from the end of the liquid crystal display panel 1 even in a case where the designed package 14 is applied with an external impact or the like. Thus, in the liquid crystal display according to the present embodiment, displacement can be prevented between the designed package 14 and the liquid crystal display panel 1 even in a case where the designed package 14 is applied with an external impact.

While description has been given to the liquid crystal display including the middle frame 7 in the present embodiment, the above-described effects can be obtained even in a case where the middle frame 7 is not provided.

Sixth Embodiment

FIG. 17 is a cross sectional view showing a liquid crystal display according to the present embodiment before a designed package 14 is incorporated, and FIG. 18 is a cross sectional view showing the liquid crystal display according to the present embodiment after the designed package 14 is incorporated. In the following description, among constituents of the liquid crystal display according to the present embodiment, those identical to constituents according to Fifth Embodiment are designated by identical symbols, and constituents which are not additionally described are assumed to be identical to those according to Fifth Embodiment.

As shown in FIG. 17, the regulator body according to the present embodiment is provided as a projecting part 18 formed on a rear frame 3 so as to project substantially perpendicularly from a plane 18a of the rear frame 3 toward a front frame 11. The projecting part 18 has a tongue-like shape and is provided at a tip thereof with a convex portion such as a hemispherical portion.

As shown in FIG. 18, when the designed package 14 is incorporated to a configuration shown in FIG. 17, the projecting part 18 elastically presses a side surface of a positioning projection 15 of the designed package 14. The positioning projection 15 of the designed package 14 passes through a through hole 12 and is brought into contact with an end of a liquid crystal display panel 1 within a space 13.

In the configuration of the liquid crystal display according to the present embodiment, similarly to the display of First Embodiment, the designed package 14 and the liquid crystal display panel 1 can be positioned directly with each other, thereby realizing accurate positioning of the designed package 14 with respect to the liquid crystal display panel 1.

In the liquid crystal display according to the present embodiment, the projecting part 18 which elastically presses the side surface of the positioning projection 15 of the designed package 14 is provided to the rear frame 3. Thus, displacement can be prevented between the designed package 14 and the liquid crystal display panel 1 more effectively in comparison to a case of Fifth Embodiment, even when the designed package 14 is applied with an external impact.

While description has been given to the liquid crystal display including a middle frame 7 in the present embodiment, the above-described effects can be obtained even when the middle frame 7 is not provided.

Seventh Embodiment

Figure 19:
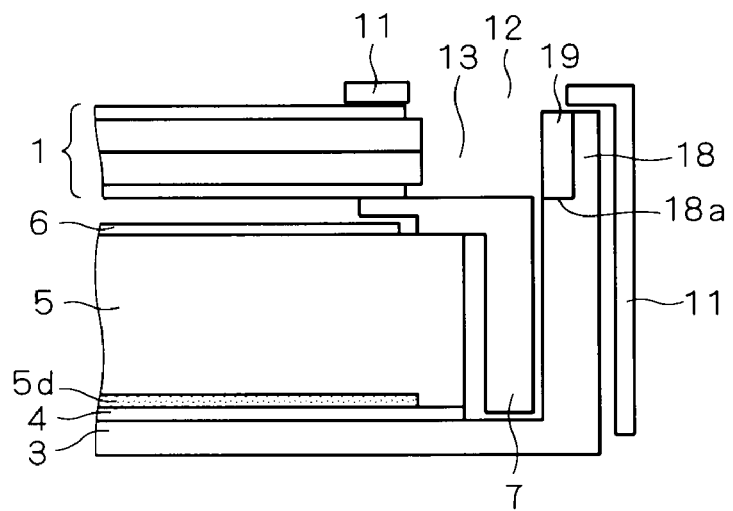
FIGS. 19 and 20 are cross sectional views each showing a configuration of a liquid crystal display according to Seventh Embodiment.
Figure 20:
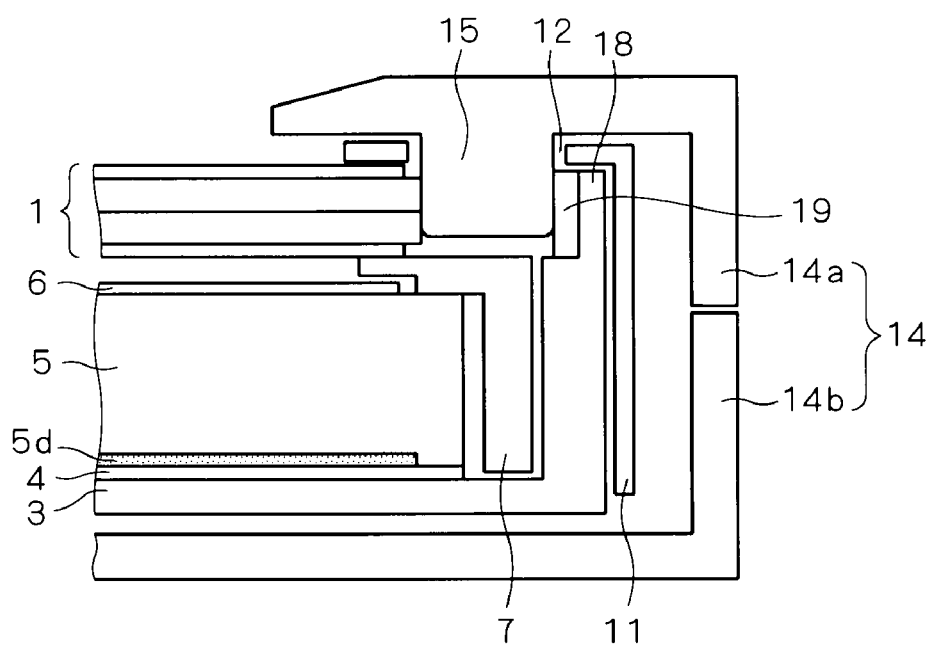

FIG. 19 is a cross sectional view showing a liquid crystal display according to the present embodiment before a designed package 14 is incorporated, and FIG. 20 is a cross sectional view showing the liquid crystal display according to the present embodiment after the designed package 14 is incorporated. In the following description, among constituents of the liquid crystal display according to the present embodiment, those identical to constituents according to Fifth Embodiment are designated by identical symbols, and constituents which are not additionally described are assumed to be identical to those according to Fifth Embodiment.

As shown in FIG. 19, a regulator body is provided as a projecting part 18 formed on a rear frame 3 so as to project substantially perpendicularly from a plane 18a of the rear frame 3 toward a front frame 11. According to the present embodiment, the regulator body further has a cushioning material 19, functioning as an elastic member, which is disposed on the projecting part 18 of the rear frame 3 so as to face a positioning projection 15 of the designed package 14 and elastically presses a side surface of the positioning projection 15 of the designed package 14.

As shown in FIG. 20, when the designed package 14 is incorporated to a configuration shown in FIG. 19, the cushioning material 19 elastically presses the side surface of the positioning projection 15 of the designed package 14. The positioning projection 15 of the designed package 14 passes through a through hole 12 and is brought into contact with an end of a liquid crystal display panel 1 within a space 13.

In the configuration of the liquid crystal display according to the present embodiment, similarly to the display of First Embodiment, the designed package 14 and the liquid crystal display panel 1 can be positioned directly with each other, thereby realizing accurate positioning of the designed package 14 with respect to the liquid crystal display panel 1.

In the liquid crystal display according to the present embodiment, the cushioning material 19, which is disposed on the projecting part 18 of the rear frame 3 so as to face the positioning projection 15 of the designed package 14, elastically presses the side surface of the positioning projection 15. Accordingly, displacement can be prevented between the designed package 14 and the liquid crystal display panel 1 more effectively in comparison to a case of Fifth Embodiment, even when the designed package 14 is applied with an external impact.

While description has been given to the liquid crystal display including a middle frame 7 in the present embodiment, the above-described effects can be obtained even when the middle frame 7 is not provided.

Eighth Embodiment

Figure 21:
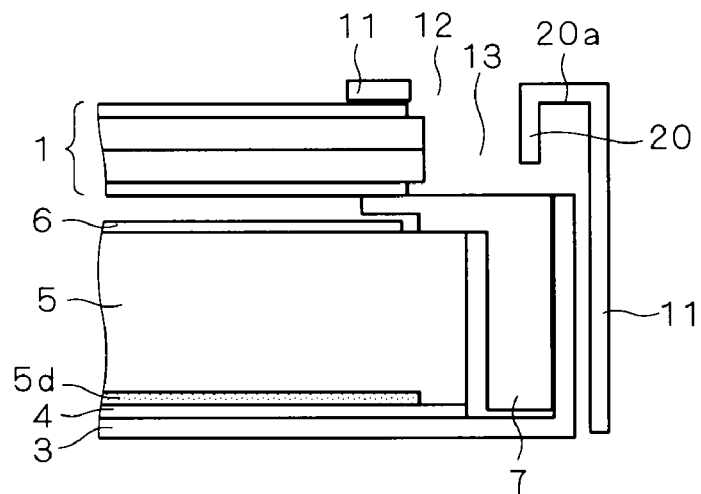
FIGS. 21 and 22 are cross sectional views each showing a configuration of a liquid crystal display according to Eighth Embodiment.
Figure 22:
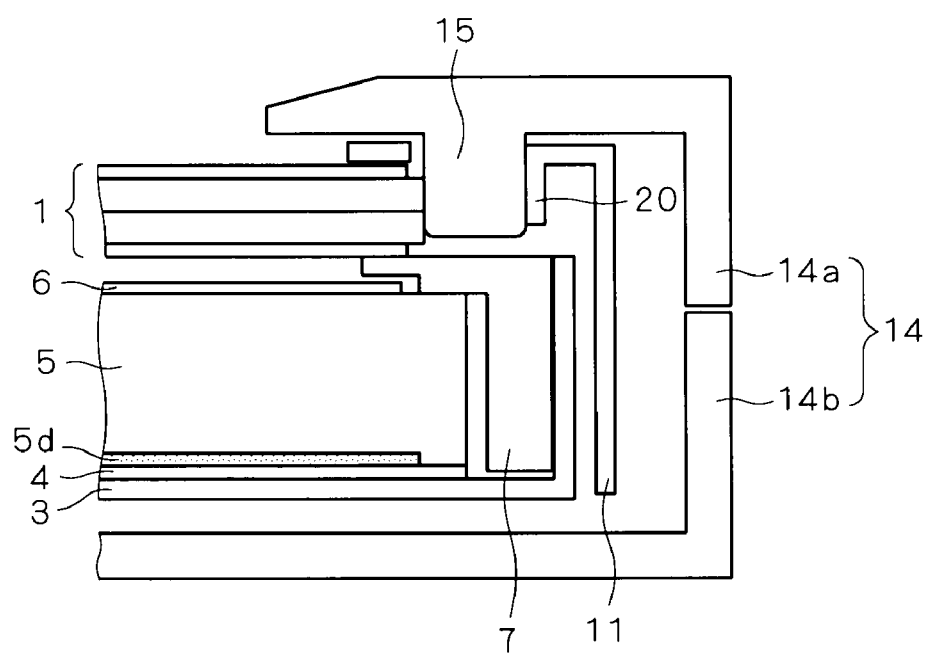

FIG. 21 is a cross sectional view showing a liquid crystal display according to the present embodiment before a designed package 14 is incorporated, and FIG. 22 is a cross sectional view showing the liquid crystal display according to the present embodiment after the designed package 14 is incorporated. In the following description, among constituents of the liquid crystal display according to the present embodiment, those identical to constituents according to First Embodiment are designated by identical symbols, and constituents which are not additionally described are assumed to be identical to those according to First Embodiment.

A frame assembly of the liquid crystal display according to the present embodiment includes, similarly to the display of First Embodiment, a rear frame 3 and a middle frame 7 each accommodating a backlight 10 which irradiates a liquid crystal display panel 1 with light, and a front frame 11 accommodating the backlight 10 with the rear frame 3 and the middle frame 7 accommodating the backlight 10 and the liquid crystal display panel 1 laid thereon. In the present embodiment, there is provided to the front frame 11 in the frame assembly a regulator body which faces an end of the liquid crystal display panel 1 with a space 13 provided therebetween to regulate a position of a positioning projection 15 of the designed package 14.

As shown in FIG. 21, the regulator body according to the present embodiment is provided as a projecting part 20 formed on the front frame 11 so as to project substantially perpendicularly from a plane 20a of the front frame 11 toward the rear frame 3. As shown in FIG. 22, when the designed package 14 is incorporated to a configuration shown in FIG. 21, the positioning projection 15 of the designed package 14 and the projecting part 20 of the rear frame 3 are brought into contact with each other. The positioning projection 15 of the designed package 14 passes through a through hole 12 and is brought into contact with the end of the liquid crystal display panel 1 within the space 13.

In the configuration of the liquid crystal display according to the present embodiment, similarly to the display of First Embodiment, the designed package 14 and the liquid crystal display panel 1 can be positioned directly with each other, thereby realizing accurate positioning of the designed package 14 with respect to the liquid crystal display panel 1.

In the liquid crystal display according to the present embodiment, the projecting part 20 which regulates the position of the positioning projection 15 of the designed package 14 is provided to the front frame 11. Accordingly, it is possible to prevent the positioning projection 15 from being detached from the end of the liquid crystal display panel 1 even in a case where the designed package 14 is applied with an external impact or the like. Thus, in the liquid crystal display according to the present embodiment, displacement can be prevented between the designed package 14 and the liquid crystal display panel 1 even when the designed package 14 is applied with an external impact.

While description has been given to the liquid crystal display including the middle frame 7 in the present embodiment, the above-described effects can be obtained even when the middle frame 7 is not provided.

Ninth Embodiment

Figure 23:
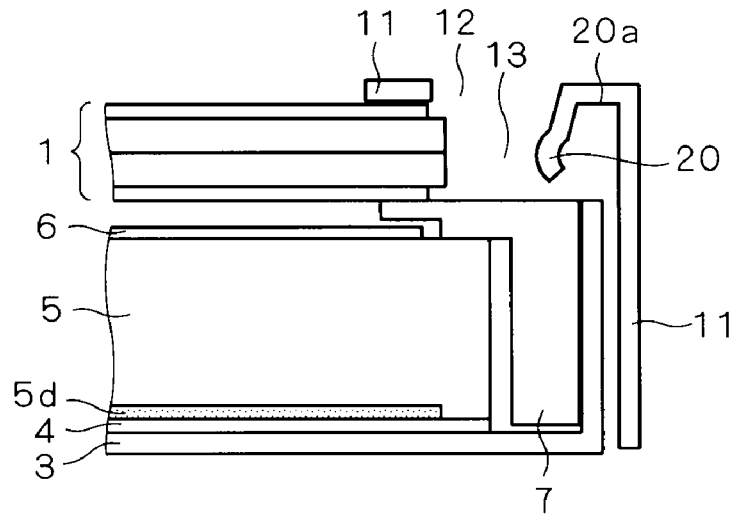
FIGS. 23 and 24 are cross sectional views each showing a configuration of a liquid crystal display according to Ninth Embodiment.
Figure 24:
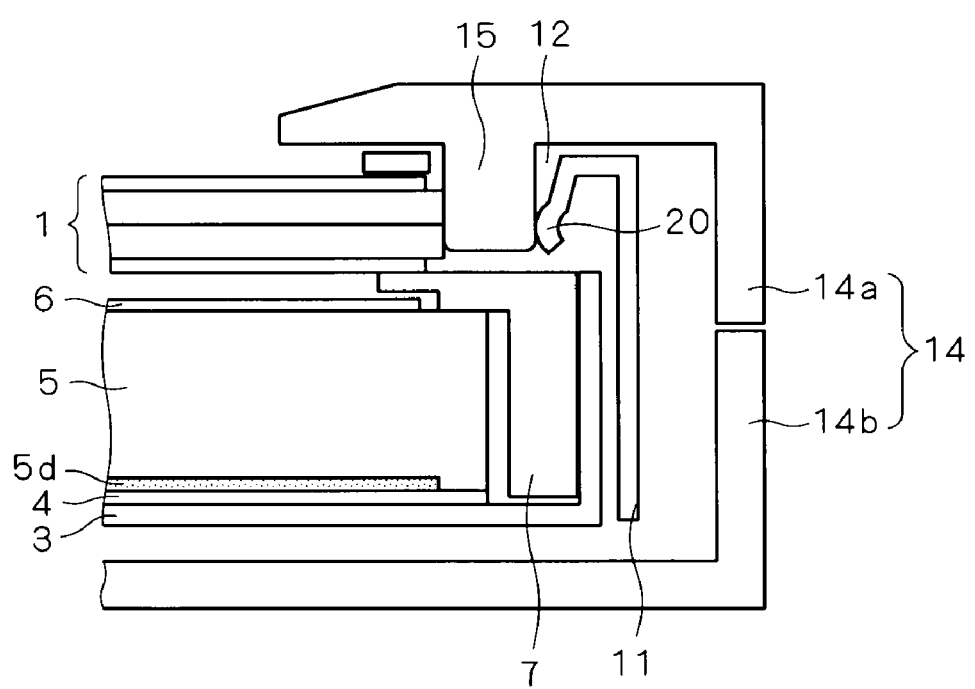

FIG. 23 is a cross sectional view showing a liquid crystal display according to the present embodiment before a designed package 14 is incorporated, and FIG. 24 is a cross sectional view showing the liquid crystal display according to the present embodiment after the designed package 14 is incorporated. In the following description, among constituents of the liquid crystal display according to the present embodiment, those identical to constituents according to Eighth Embodiment are designated by identical symbols, and constituents which are not additionally described are assumed to be identical to those according to Eighth Embodiment.

As shown in FIG. 23, a regulator body is provided as a projecting part 20 formed to a front frame 11 so as to be partially bent to project substantially perpendicularly from a plane 20a of the front frame 11 toward a rear frame 3. The projecting part 20 has a tongue-like shape and is provided at a tip thereof with a convex portion such as a hemispherical portion.

As shown in FIG. 24, when the designed package 14 is incorporated to a configuration shown in FIG. 23, the projecting part 20 elastically presses a side surface of a positioning projection 15 of the designed package 14. The positioning projection 15 of the designed package 14 passes through a through hole 12 and is brought into contact with an end of a liquid crystal display panel 1 within a space 13.

In the configuration of the liquid crystal display according to the present embodiment, similarly to the display of First Embodiment, the designed package 14 and the liquid crystal display panel 1 can be positioned directly with each other, thereby realizing accurate positioning of the designed package 14 with respect to the liquid crystal display panel 1.

In the liquid crystal display according to the present embodiment, the projecting part 20 which elastically presses the side surface of the positioning projection 15 of the designed package 14 is provided to the front frame 11. Accordingly, displacement can be prevented between the designed package 14 and the liquid crystal display panel 1 more effectively in comparison to a case of Eighth Embodiment, even when the designed package 14 is applied with an external impact.

While description has been given to the liquid crystal display including a middle frame 7 in the present embodiment, the above-described effects can be obtained even when the middle frame 7 is not provided.

Tenth Embodiment

Figure 25:
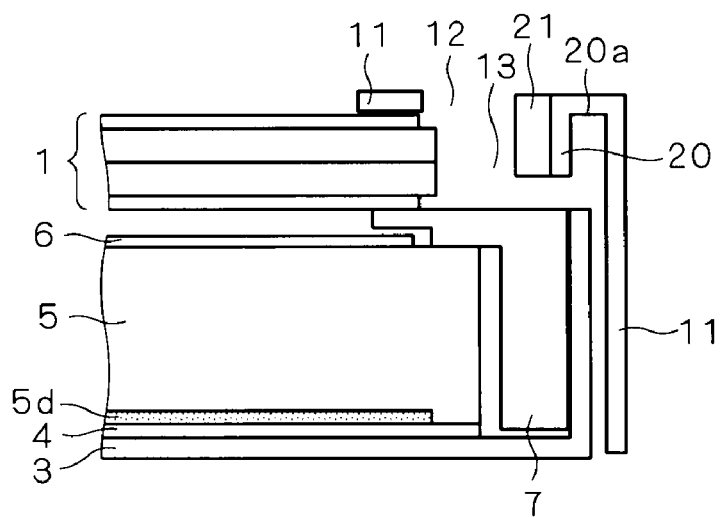
FIGS. 25 and 26 are cross sectional views each showing a configuration of a liquid crystal display according to Tenth Embodiment.
Figure 26:
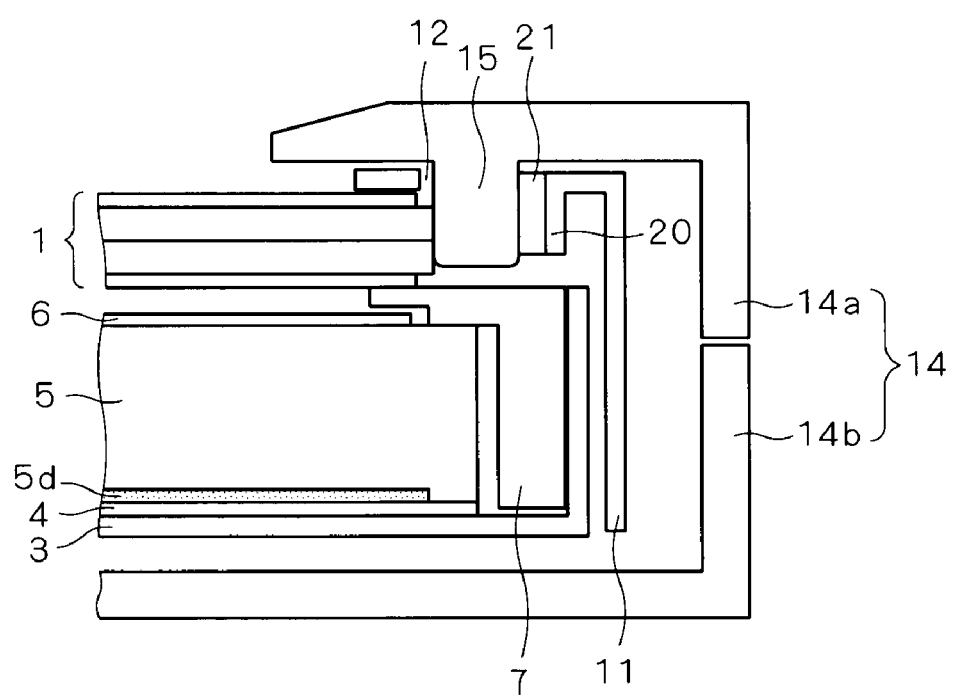

FIG. 25 is a cross sectional view showing a liquid crystal display according to the present embodiment before a designed package 14 is incorporated, and FIG. 26 is a cross sectional view showing the liquid crystal display according to the present embodiment after the designed package 14 is incorporated. In the following description, among constituents of the liquid crystal display according to the present embodiment, those identical to constituents according to Eighth Embodiment are designated by identical symbols, and constituents which are not additionally described are assumed to be identical to those according to Eighth Embodiment.

As shown in FIG. 25, a regulator body is provided as a projecting part 20 formed on a front frame 11 so as to project substantially perpendicularly from a plane 20a of the front frame 11 toward a rear frame 3. According to the present embodiment, the regulator body further has a cushioning material 21 which is disposed on the projecting part 20 of the front frame 11 so as to face a positioning projection 15 of the designed package 14 and functions as an elastic member to elastically press a side surface of the positioning projection 15 of the designed package 14.

As shown in FIG. 26, when the designed package 14 is incorporated to a configuration shown in FIG. 25, the cushioning material 21 elastically presses the side surface of the positioning projection 15 of the designed package 14. The positioning projection 15 of the designed package 14 passes through a through hole 12 and is brought into contact with an end of a liquid crystal display panel 1 within a space 13.

In the configuration of the liquid crystal display according to the present embodiment, similarly to the display of First Embodiment, the designed package 14 and the liquid crystal display panel 1 can be positioned directly with each other, thereby realizing accurate positioning of the designed package 14 with respect to the liquid crystal display panel 1.

In the liquid crystal display according to the present embodiment, the cushioning material 21, which is disposed on the projecting part 20 of the front frame 11 so as to face the positioning projection 15 of the designed package 14, elastically presses the side surface of the positioning projection 15. Accordingly, displacement can be prevented between the designed package 14 and the liquid crystal display panel 1 more effectively in comparison to a case of Eighth Embodiment, even when the designed package 14 is applied with an external impact.

While description has been given to the liquid crystal display including a middle frame 7 in the present embodiment, the above-described effects can be obtained even when the middle frame 7 is not provided.

While the invention has been shown and described in detail, the foregoing description is in all aspects illustrative and not restrictive. It is therefore understood that numerous modifications and variations can be devised without departing from the scope of the invention.

What is claimed is:

1. A display device comprising:
a display panel;
a frame assembly accommodating said display panel and being provided with a space adjacent to an end of the accommodated display panel; and
a package covering said frame assembly, wherein
said frame assembly is provided, on a surface covering an end of a display side of said display panel, with a through hole exposing said space and said end of said display panel adjacent to said space, and
said package is provided, on an inner surface thereof, with a projection that passes through said through hole to be brought into contact with said end of said display panel within said space.

2. The display device according to claim 1, wherein
said frame assembly is provided with a regulator body that faces said end of said display panel with said space provided therebetween to regulate a position of said projection of said package.

3. The display device according to claim 2, wherein
said regulator body includes a projecting part formed on said frame assembly.

4. The display device according to claim 3, wherein
said projecting part elastically presses a side surface of said projection on said package.

5. The display device according to claim 3, wherein
said regulator body further includes an elastic member that is disposed on said projecting part of said frame assembly so as to face said projection on said package and elastically presses the side surface of said projection on said package.

6. The display device according to claim 2, wherein said frame assembly includes:
a first frame accommodating a backlight that irradiates said display panel with light; and
a second frame accommodating said backlight, with said first frame accommodating the backlight, and said display panel laid thereon, in which
said regulator body is provided on one of said first frame and said second frame.

\* \* \* \* \*